July 5, 1932.  A. E. REID  1,866,057
PISTON AND CONNECTING ROD
Filed May 25, 1929  2 Sheets-Sheet 1
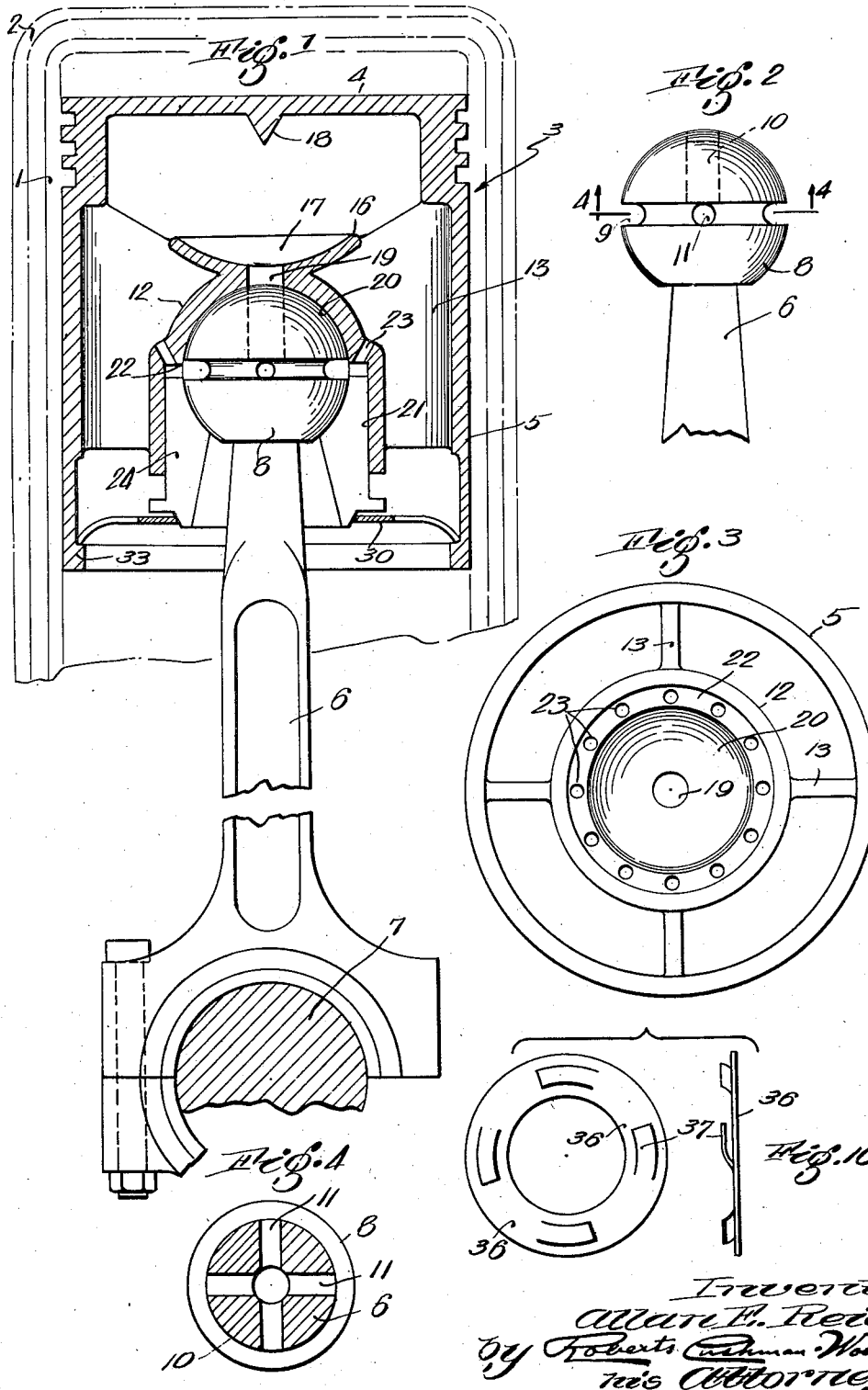

July 5, 1932.  A. E. REID  1,866,057
PISTON AND CONNECTING ROD
Filed May 25, 1929   2 Sheets-Sheet 2
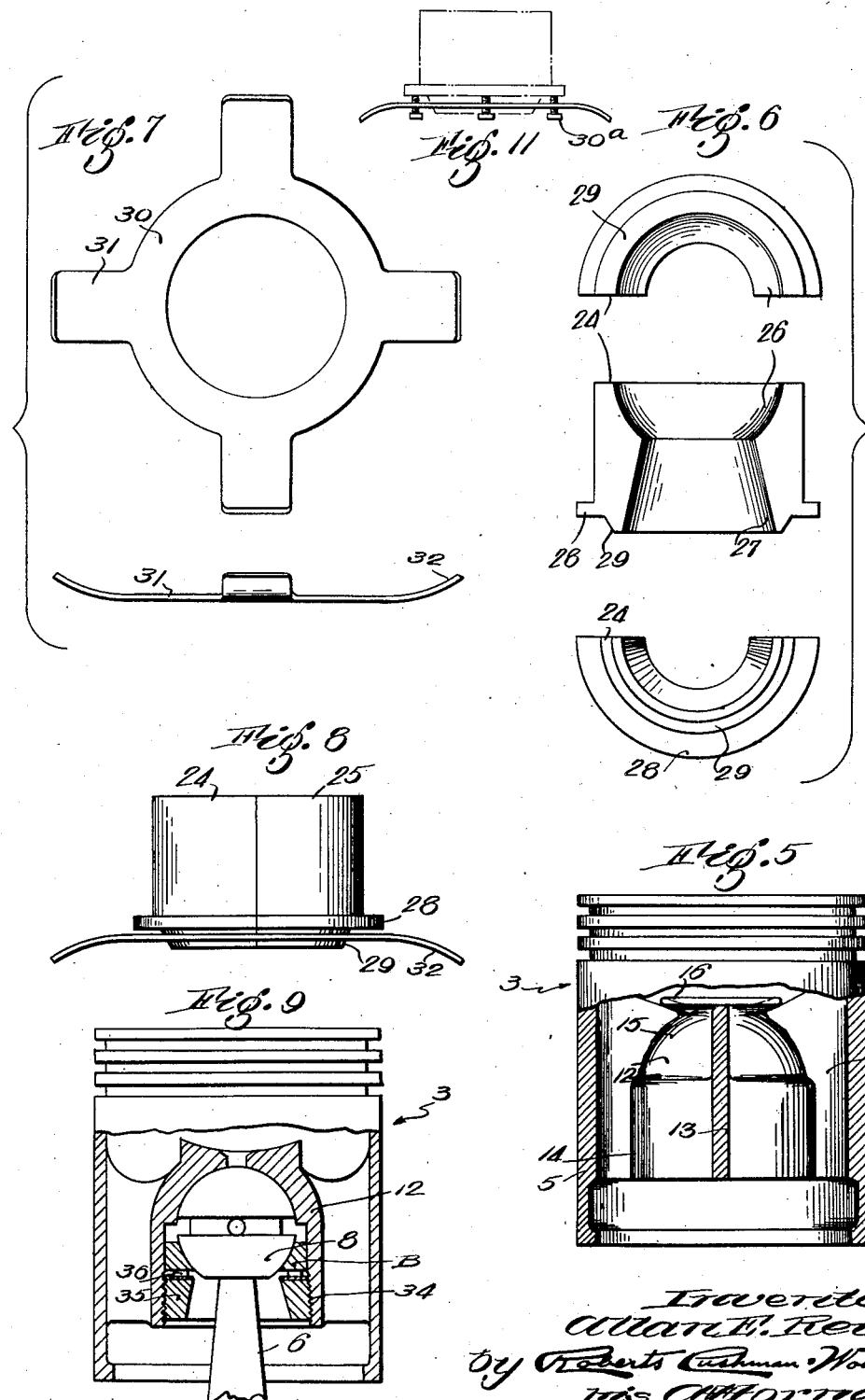

Patented July 5, 1932

1,866,057

UNITED STATES PATENT OFFICE

ALLAN E. REID, OF ALLSTON, MASSACHUSETTS, ASSIGNOR TO REID PISTON COMPANY, OF BROOKLINE, MASSACHUSETTS, A CORPORATION OF MASSACHUSETTS

PISTON AND CONNECTING ROD

Application filed May 25, 1929. Serial No. 365,393.

This invention pertains to pistons and connecting rods of that general type in which the connecting rod transmits motion from the piston to the crank shaft without interposition of a piston rod and cross head and wherein the piston has a hollow body or skirt portion into which one end of the connecting rod projects. Such pistons are commonly known as "trunk" pistons and are almost universally employed in internal combustion engines.

Modern practice in internal combustion engine design tends to an increase in speed with a corresponding decrease in cylinder and piston diameter, but at such high speeds the pressures developed between the parts are very great so that most thorough lubrication is necessary in order to avoid heating and excessive wear. On the other hand, at such high speeds, the usual wrist pin employed for uniting the piston and connecting rod must be of large diameter to withstand the stresses imposed upon it and to afford the necessary bearing surfaces, but this large wrist pin takes up so much of the space within the small piston that splash lubrication of the bearing is seriously interferred with and resort must be had to the provision of oil channels lengthwise of the connecting rod. This practice weakens the rod and does not always provide a dependable and adequate source of lubrication and as a result of the high pressures between the piston, wrist pin and connecting rod, the parts wear so that knocking often develops after a comparatively short period of use. This necessitates replacement of the wrist pin and often times the reboring of the journal openings in the piston and rod.

In accordance with the present invention I provide for adequate and dependable lubrication of the bearings between the piston and connecting rod, wholly dispensing with the usual wrist pin, while at the same time providing the desired large bearing surfaces to carry the thrust pressure; I arrange such bearing surfaces at a distance from the piston head so that danger of overheating and oil carbonization is eliminated; I provide automatic compensation for such wear as may develop from long continued use; I provide a connection between the rod and piston such that the rod may be disconnected from the piston without removing the latter from the engine cylinder; I provide a connection of universal joint type which allows the piston complete freedom to rotate relatively to the cylinder wall; and I embody all of the above advantageous features in a simple construction capable of manufacture at a cost not substantially exceeding the cost of production of usual arrangements.

While my invention is particularly applicable to internal combustion engine use, I contemplate that it is not restricted thereto but may be found useful in thermal motors of other forms as well as in pumps, air compressors and the like. Accordingly, while for convenience of description and illustration, I may hereinafter make reference to the present invention as embodied in an internal combustion engine I do not intend thereby to restrict the scope of the invention or to limit its field of use. Moreover, while I herein describe certain desirable embodiments of my invention, it is to be understood that the illustration and description of such embodiments is by way of example only and that I do not limit the scope of the invention thereby but only as defined in the appended claims.

In the accompanying drawings:

Fig. 1 is a vertical section partly in elevation showing one desirable form of my invention, and indicating its embodiment in an internal combustion engine;

Fig. 2 is a fragmentary view showing the end portion of the connecting rod;

Fig. 3 is a bottom plan view of the piston with the connecting rod and movable bearing member removed;

Fig. 4 is a transverse section on a line 4—4 of Fig. 2;

Fig. 5 is a fragmentary side view of the piston, partly in section and to smaller scale and omitting the connecting rod and lower bearing member;

Fig. 6 is a composite view illustrating the lower or movable bearing member;

Fig. 7 is a composite view illustrating one desirable resilient retainer member;

Fig. 8 is a side elevation showing the movable bearing member assembled with the retainer spring;

Fig. 9 is a view similar to Fig. 5 but showing a modified construction;

Fig. 10 is a composite view illustrating a spring device employed in the construction of Fig. 9; and Fig. 11 is an edge elevation of a resilient retainer provided with tension adjusting means.

Referring to the drawings, the numeral 1 indicates a portion of the cylinder of an internal combustion engine having the head 2. The piston 3 which is arranged within the cylinder is provided with a head 4 and the skirt portion 5, this piston being of the type usually known as a "trunk" piston. The connecting rod 6 is provided at its lower end with the usual journal bearing for the reception of the crank 7, and at its other end with a pivot member, here indicated as of spherical contour, adapted to cooperate with a bearing carried by the piston to form an articulated joint between the piston and rod. While a spherical head is here indicated and for certain purposes is preferable, I contemplate that in the broader aspects of the invention, a cylindrical or other shape of head may be found useful.

Preferably the head 8 is provided with an oil duct 10, here shown as aligned with the axis of the rod 6, and with a circumferential oil distributing groove 9, here shown as disposed in a plane at right angles to the axis of the rod. One or more auxiliary ducts 11 lead from the main duct 10 into the bottom of the groove 9.

Within the piston I arrange a fixed bearing 12 which is spaced from the inner surface of the piston head so as to leave a substantially unobstructed chamber above it, and which is preferably fixed in position by means of a plurality of webs 13 uniting it to the piston wall. Preferably the bearing member 12 and the webs 13 are integral with the piston proper. In the preferred construction, the outer or lower end of the fixed bearing member 12 is of cylindrical contour as indicated at 14, while its inner or upper part is of dome-like shape as shown at 15. The exact outer contour of this bearing is not essential to the present invention, but it should be noted that it is spaced from the side walls and head of the piston, so as to provide free passage to oil splashed from the crank case up into the head end of the piston. Preferably, the inner end of the fixed bearing member 12 is furnished with an upstanding annular rib 16 defining an oil-receiving basin 17 having a downwardly concave bottom. The fixed bearing 12 is hollow and an oil passage 19 leads from the bottom of the basin 17 to the interior of the hollow bearing member.

The inner end of the cavity or chamber within the fixed bearing member is of spherical curvature as shown at 20, while the outer portion of this cavity is of cylindrical curvature as shown at 21, the cavity being open at its outer end. Preferably the cylindrical portion of the cavity is of somewhat greater diameter than the spherical portion 20, leaving a shoulder 22 between these surfaces, and I preferably provide a plurality of circumferential space oil passages 23 leading from this shoulder 22 to the outside of the bearing member.

Cooperating with the fixed bearing member I provide a movable or lower bearing member,—preferably comprising a plurality of independent and separable parts, here shown as the parts 24 and 25, although this bearing may be divided into a greater number of segments if desired. As shown, (Figs. 6 and 8) this movable bearing is of annular form, each of the members 24 and 25 constituting a half circle. The inner portion of the movable bearing member is furnished with a spherical surface 26 adapted to cooperate with the surface 20 of the fixed bearing to form a socket for the reception of the end 8 of the connecting rod. The lower portion of the movable bearing is preferably furnished with a more or less conical inner surface 27 adapted to accommodate the connecting rod 6 as the latter swings with the crank. The outer end of the movable bearing also preferably comprises a radial shoulder or flange 28 and a projecting rib 29 having a beveled outer surface.

I also provide a resilient retainer device or snap ring 30 consisting of a piece of spring metal shaped to provide an annular portion and a plurality of projecting legs 31 each of which is turned downwardly at its outer end as shown at 32. The opening at the center of the part 30 is preferably of such diameter that when the member 30 is placed over the beveled rib 29 of the movable bearing, it will engage the beveled surface of the rib at an intermediate point. The lower end of the piston is furnished with an inwardly projecting abutment rib 33 whose upper or inner surface is machined off accurately to form a seat for the ends of the legs 31 of the retainer device.

In assembling the parts above described, the ball 8 at the end of the connecting rod is first thrust through the opening in the retainer device and is then pushed upwardly into the cavity in the fixed bearing member. The parts 24 and 25 of the movable bearing are then assembled around the rod and telescoped within the cylindrical outer portion of the fixed bearing in which the movable bearing fits with a snug but sliding fit. The spring retainer device is now pushed upwardly into engagement with the beveled surface 29 and its legs are snapped up above the rib 33 until their ends rest on the upper surface of such rib. As thus positioned the retainer exerts an upward thrust against the movable bearing, securely holding the bearing in position with its spherical surface in resilient contact with the lower portion of the ball 8. At the same time the pressure of the spring member against the beveled surface of rib 29 causes the members 24 and 25 of the bearing to engage each other closely so that the parts are all held firmly in assembled relation. If desired, as shown in Fig. 11, the spring retainer may be provided with adjusting screws 30ª adapted to engage the flange 28 of the movable bearing member and thereby to vary the pressure of the lower bearing against the ball 8.

In the arrangements shown in Figs. 9 and 10, the parts in general are similar to those above described except that the movable bearing B consists of a plain ring divided into segments if desired, and which is held in position within the fixed bearing by means of a screw-threaded collar 35 engaging an internally screw-threaded portion of the bearing 12. Interposed between the ring B and the collar 35 is a spring 36 preferably consisting of a washer-like member or spring steel or other suitable material having struck-up therefrom the fingers 37. In this arrangement, as well as that above described, the lower or movable bearing B is resiliently held against the ball 8 so as automatically to take up ware which may develop between the ball and the wall of the socket as formed by the spherical surfaces of the fixed and movable bearing members.

In both forms of the device the bearing for the upper end of the connecting rod is spaced from the piston head and from the walls of the piston, and there is a free passage for oil which may collect upon the inner surfaces of the piston head and which is assisted in dropping therefrom into the basin 17 by a pointed projection 18 on the inner surface of the piston head. This oil flows freely down through the passage 19 and out through the ducts 11 into contact with the surface of the ball 8, thus providing very efficient lubrication for the parts. The connecting rod may readily be removed from the piston without withdrawing the piston from the cylinder by removal of the snap spring 30 in the case of Fig. 1 or by unscrewing the collar 35 of the device shown in Fig. 9. In the arrangement shown in Fig. 1 no screw threading of the parts is necessary. The piston with its socket and the shoulder upon the rib 33 may be machined without removing the piston from the centers upon which it is turned, and thus the device may be made at a relatively low cost, while at the same time providing advantages not found in pistons of usual type.

While I have shown certain details of construction as desirable, I contemplate that other and equivalent arrangements may be provided as occasion may demand without departing from the spirit of the invention and I regard all such substitutions of equivalents and immaterial changes in detail and dimensions of parts as falling within the scope of my invention as expressed in the appended claims.

I claim:

1. The combination of a piston and a connecting rod, the piston having a bearing comprising a fixed part and a movable part cooperating to define a socket, the rod having a member adapted to fit within said socket and with the latter to form an articulated joint, a circumferentially extending abutment rib projecting from the inner surface of the piston, and a spring having an element which engages the movable bearing part and a plurality of legs resting upon the abutment rib.

2. The combination of a piston and a connecting rod, the piston having a bearing comprising a fixed part rigid with the piston and having a cavity of substantially spherical curvature facing away from the head of the piston, and a movable part also having a cavity of substantially spherical curvature, said cavities cooperating to form a socket, a ball on the end of the rod adapted to fit within said socket, a spring comprising an element engaging the movable bearing part and a plurality of outstanding legs, and means carried by the piston providing supports for said legs, whereby said spring may be effective for constantly urging the movable bearing part toward the fixed bearing part.

3. The combination of a trunk piston and a connecting rod, the piston having an internal bearing comprising a fixed part rigid with the piston and having a cavity of substantially spherical curvature facing away from the head of the piston and an annular part movable with respect to the piston when assembled and also having a cavity of substantially spherical curvature, said cavities cooperating to form a socket, the connecting rod passing through the annular movable member and having a ball fitting within the socket, a spring having an annular portion through which the rod passes and which engages the movable bearing part, and legs projecting from the annular portion of the spring into engagement with the piston.

4. The combination of a trunk piston and a connecting rod, the piston having an internal bearing comprising a fixed part having a cavity of substantially spherical curvature and an annular movable part also having a cavity of substantially spherical curvature, said cavities cooperating to form a socket, said annular movable part comprising a plurality of independent substantially segmental sections, and means engageable with the segmental sections and with the side walls of the piston for holding said sections in assembled relation and for retaining the movable part of the bearing in cooperative relationship to the fixed part, the connecting rod passing through said annular part and having a head fitting within said socket.

5. The combination of a trunk piston and a connecting rod, the piston having an internal bearing comprising a fixed part spaced from the inner surfaces of the piston head and side walls and having a concave bearing surface facing away from the head of the piston, said part having an oil collecting basin disposed between said fixed part and the head of the piston and having free and unrestricted communication with the interior of the piston, the bearing having a socket, an oil passage leading from the basin to the socket, and a head on the connecting rod cooperating with said socket to form an articulated joint.

6. The combination of a trunk piston and a connecting rod, the piston having an internal bearing comprising a fixed part spaced from the inner surfaces of the piston head and side walls and having a concave bearing surface facing away from the head of the piston, said part having an oil collecting basin disposed between said fixed part and the head of the piston and having free and unrestricted communication with the interior of the piston, the bearing having a socket, an oil passage leading from the basin to the socket, and a head on the connecting rod cooperating with the socket to form an articulated joint, said head having oil ducts adapted to distribute oil from said passage over the inner surface of the socket.

7. The combination of a trunk piston and a connecting rod, the piston having an internal bearing comprising a fixed part spaced from the inner surfaces of the piston head and side walls, said part having an oil collecting basin at the inner end, the bottom of the basin being concave, the bearing having a socket, an oil passage leading from the basin to the socket, and a head on the connecting rod cooperating with the socket to form an articulated joint, said head having a main duct adapted in certain positions of the rod to align with the oil passage, a circumferential oil distributing groove, and branch ducts leading from the main duct to said groove.

8. The combination of a trunk piston and a connecting rod, the piston having an internal bearing comprising a fixed part having a cavity of substantially spherical curvature facing away from the head of the piston and an annular movable part also having a cavity of substantially spherical curvature, said cavities cooperating to form a socket, and a head on the connecting rod adapted to fit with said socket, the fixed bearing part having circumferentially spaced oil passages leading inwardly to the crevice between the fixed and movable bearing parts.

9. The combination of a trunk piston and a connecting rod, said piston having a concentrically arranged fixed bearing member spaced from the inner surfaces of the piston head and side walls and integrally united to the latter by spaced webs, said member having a cavity therein, and an annular movable bearing member cooperable with the fixed member to provide a socket for the inner end of the connecting rod, said movable member comprising a plurality of segments adapted to be assembled around the connecting rod, and resilient means engageable with the annular bearing member and with the side walls of the piston for retaining said segments in assembled relation.

10. A trunk piston having a head and side walls, said piston having a concentrically arranged fixed bearing member spaced from the inner surface of the head and side walls of the piston, said bearing member having an internal cavity opening at its outer end, and an integral annular rib at the inner end of the bearing forming an oil basin, said basin having free and unrestricted communication with the interior of the piston, the bearing member having a passage leading from said basin directly to the cavity.

11. A trunk piston having a head and side walls, said piston having a concentrically arranged fixed bearing member spaced from the inner surface of the head and side walls of the piston, said bearing member being hollow and having cylindrical side walls and a dome-like inner end, and an annular rib projecting from the dome-like surface of the bearing member to form an oil collecting basin, said basin having free and unrestricted communication with the interior of the piston, the bearing member having a passage leading from the basin directly to its interior.

12. A trunk piston having a head and side walls, said piston having a concentrically arranged fixed bearing member spaced from the inner surface of the head and side walls of the piston, webs integrally uniting the bearing member to the piston wall, the bearing member being hollow and having cylindrical side walls and a dome-like inner end, the bearing having a cavity which is of spherical curvature at its inner end and which is cylindrical near its outer end, the bearing member having passages for conducting oil to the cavity, a movable annular bearing member freely movable through the outer end of the cavity and telescoping within the cylindrical portion of said cavity, the inner end of the movable bearing member having a spherically curved surface, and resilient means urging said movable bearing member inwardly relatively to the fixed bearing member.

13. The combination of a piston and a connecting rod, the piston having a bearing comprising a fixed part and a movable part cooperating to define a socket, said fixed part having a bearing surface facing away from the head of the piston and a lower end having an internally screw-threaded portion, a screw-threaded collar coaxial with the fixed bearing member engaging the internally screw-threaded portion of the fixed bearing member, a rod having a member adapted to fit within said socket and with the latter to form an articulated joint, and an annular spring interposed between the collar and the movable bearing member, said spring comprising a washer-like member having a plurality of acclivous resilient fingers for retaining the movable bearing member in position.

14. A trunk piston having a head and side walls, said piston having a concentrically arranged fixed bearing member spaced from the inner surface of the head and side walls of the piston, webs integrally uniting the bearing member to the piston wall, the bearing member being hollow and having cylindrical side walls and a dome-like inner end, the bearing having a cavity which is of spherical curvature at its inner end and which has an internally screw-threaded portion at its outer end, the bearing member having passages for conducting oil to the cavity, a movable annular bearing member telescoping within the cylindrical portion of said cavity, the inner end of the movable bearing member having a spherically curved surface, a screw-threaded collar engaging the internally screw-threaded portion of the fixed bearing member, and a spring member interposed between the collar and the movable bearing member, said spring member comprising a washer-like collar having a plurality of resilient fingers urging said movable bearing member inwardly relatively to the fixed member.

Signed by me at Boston, Massachusetts, this 23rd day of May, 1929.

ALLAN E. REID.